United States Patent [19]

Tyler

[11] Patent Number: 4,868,717
[45] Date of Patent: Sep. 19, 1989

[54] MOLDED CAPACITOR HEADER

[76] Inventor: Kenneth J. Tyler, 5140 E. Washington St., #4, Indianapolis, Ind. 46219

[21] Appl. No.: 201,700
[22] Filed: Jun. 3, 1988
[51] Int. Cl.⁴ ............................................. H01G 9/00
[52] U.S. Cl. .................................................. 361/519
[58] Field of Search ...................... 361/433, 15, 306 C, 361/519

[56] References Cited

U.S. PATENT DOCUMENTS 4,047,790  9/1977  Carino ........................ 361/433 H X
4,208,699  6/1980  Philpott et al. ................. 361/433 H

FOREIGN PATENT DOCUMENTS 1388052  3/1975  United Kingdom ................ 361/275

Primary Examiner—Donald A. Griffin
Attorney, Agent, or Firm—Richard C. Litman

[57] ABSTRACT

A molded capacitor header with a circumferential annular flange has an inwardly adjacent elastomeric gasket retaining groove. Said header with the circumferential flange and adjacent gasket retaining groove provides a more durable and stronger seal of an electrolytic capacitor casing so that the electrolytic capacitor is less susceptible to leakage when subjected to high temperatures. Furthermore, the configuration of said electrolytic capacitor header protects the elastomeric gasket from making contact with the electrolytic vapors contained within said casing thereby discouraging the corrosion of the gasket which is initiated by the contact of the electrolytic vapors therewith.

2 Claims, 1 Drawing Sheet

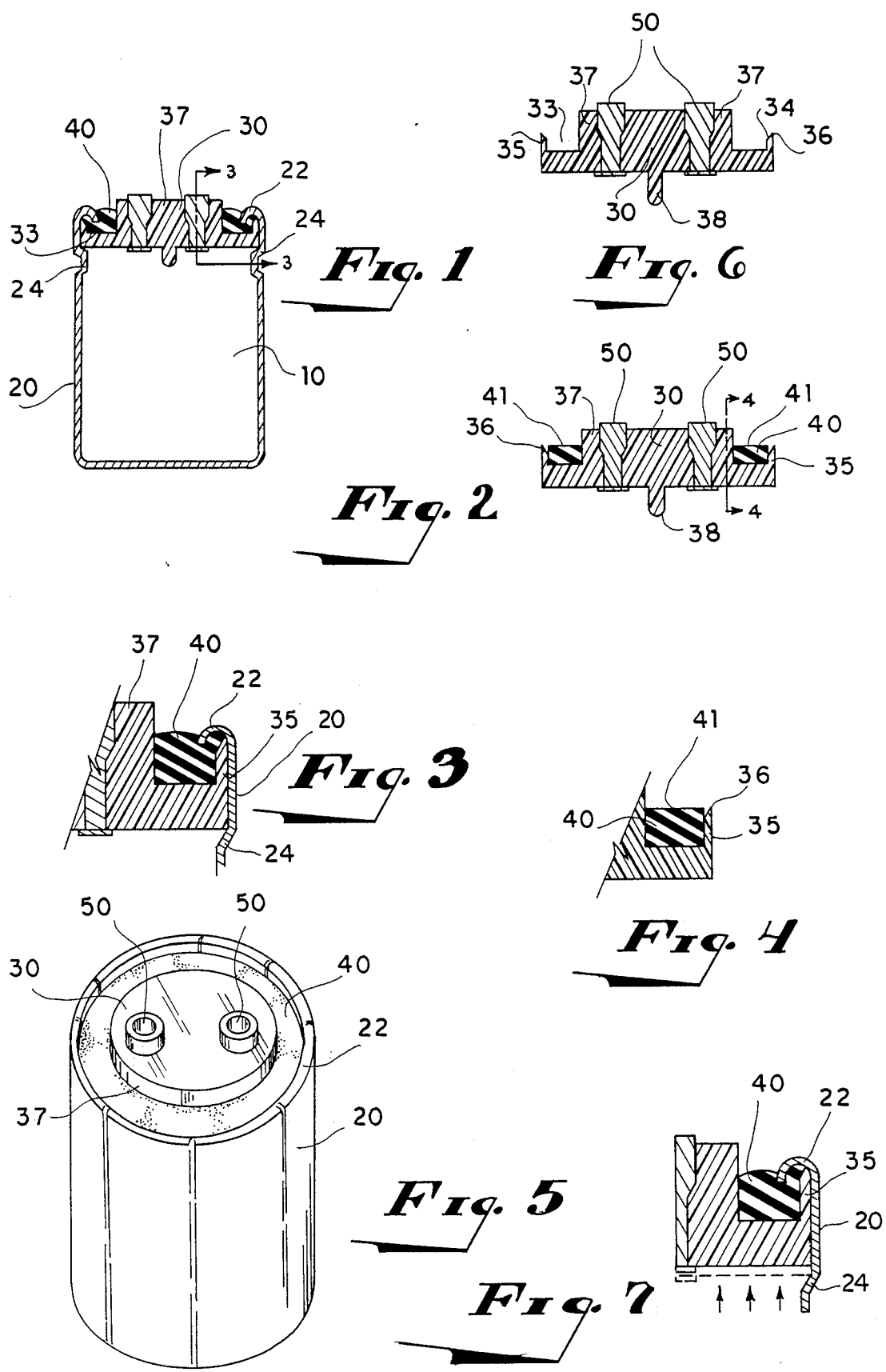

MOLDED CAPACITOR HEADER

FIELD OF THE INVENTION

The present invention relates to electrolytic capacitors, and more particularly the invention is directed to an improved molded header construction for providing a tighter and more durable seal of the open end of the housing for the electrolytic capacitor.

BACKGROUND OF THE INVENTION

Conventionally, electrolytic capacitors comprise a case with an open top end and a closed bottom end, a cartridge impregnated with an electrolyte therein, and a molded dielectric header used in combination with an elastomeric or rubber gasket for sealing the open end of the case and encapsulating the impregnated cartridge there within. The impregnated cartridge, also to be referred to as the capacitor section hereinafter, is conventionally made up of a series of layers which include a first aluminum foil coated with a layer of aluminum oxide, a paper separator, a second layer of aluminum and a farther layer of paper. The assembled layers are spirally wound to form an elongated cylinder which is impregnated with an electrolyte solution. This capacitor section is contained within the case, which is normally of aluminum material. The upper end of the capacitor section includes first and second tabs connected respectively to the first and second layers of foil to provide anode and cathode connections. The tabs, in turn, are connected within the case to terminals extending through a molded capacitor header that serves to cover the open end of the capacitor case.

A rubber gasket is inserted between the circumferential edges of the molded capacitor header and the capacitor case and afterwards, the top end of the open capacitor case is crimped or rolled over towards the inside of the case to cause the molded capacitor header to be forced tight against a ledge inside the capacitor case, thereby providing a sealed closure of the open end of the capacitor case.

In one type of capacitor which has been available in the field for years, the capacitor case is made of aluminum material, the header is made of phenolic or similar thermosetting material, and the electrolyte is of a glycol type. While such capacitors have performed well over the years, the market requires small and large capacitors to perform in environments where the temperature exceeds 85° C. This requirement creates the need and demand for capacitors of small and large size which are capable of operating at high temperatures and maintaining a reliable seal.

The conventional capacitor described above is limited in its use to environments in which the temperature is less than 85° C. The glycol type electrolyte used in such capacitors requires significant amounts of water, and with exposure of such capacitors to higher temperatures, the water tends to hydrate the foils with consequent injury to the capacitor.

In an attempt to provide a capacitor of smaller size with operating capabilities which are at least the equivalent of the glycol capacitor, the field has turned to the use of new types of electrolytes which will operate reliably in environments of higher temperature. However, while such electrolytes are known to have inherent characteristics and advantages, it has been found that the header and the rubber seals of the conventional capacitors have a short life. After a period of use at high temperatures, the materials of the header and the gasket swell and become soggy, hence, causing leakage and sealing problems.

Manufactures have provided headers for small and large diameter capacitors which withstand electrolytes that operate reliably in environments of higher temperatures, but capacitors employing these headers and electrolytes in temperatures greater than 85° C., still have problems with the deterioration of the rubber gasket and the weakening of the seal it provides between the header and the case.

DESCRIPTION OF THE PRIOR ART

Various prior art electrolytic capacitor devices, and the like, as well as their apparatuses and the method of their construction in general, are known and are found to be exemplary of the U.S. prior art. They are:

| U.S. Pat. No. | Inventor |
| --- | --- |
| 1,920,799 | Lilienfeld |
| 2,018,486 | Cole |
| 2,758,149 | Brennan |
| 4,208,699 | Philpott et al. |
| 4,342,070 | Evans |

In all of the above-listed patents, a large portion of a rubber gasket contacts the inner wall of the case. Over a period of time, the electrolytic vapors penetrate between the capacitor header and the inner wall of the capacitor case and begin to deteriorate the rubber gasket, eventually causing the seal to fail.

Furthermore, when closing and sealing the open end cases as in the above U.S. Pat. Nos. 2,018,486; 4,208,699; and 4,342,070; the excessive case roll-over pressure and the consequent deformation of the compressed rubber gasket exerts an outward force against the inner wall of the case and allows some of the rubber gasket to be squeezed down between the capacitor header and the inner wall of the case. When an electrolytic capacitor is exposed to excessive heat, the capacitor header, as well as the rubber gasket, loses some of its physical characteristics and, as the internal electrolyte vapor pressure increases, the capacitor header is pressed upward, allowing the electrolytic vapors to penetrate between the capacitor header and the inner wall of the case and come into contact with the rubber gasket. The excessive heat and electrolyte vapors accelerate the deterioration of the rubber gasket and decrease the life of the seal.

The above-listed patents or known prior uses teach and disclose various types of electrolytic capacitors and capacitor headers of sorts and of various manufactures, and the like, as well as methods of their construction; but none of them, whether taken singly or in any combination, disclose the specific details of the combination of the present invention in such a way as to bear upon the claims herein.

SUMMARY OF THE INVENTION

The present invention focuses on closing and sealing an electrolytic capacitor. It is an object, advantage, and feature of the present invention to provide a novel capacitor header that better seals the open end of an electrolytic capacitor in use, and lends itself to applications with all types of current electrolytic capacitors.

Another object of the present invention is directed further to a device providing for the protection of the rubber gasket sealing the capacitor from the electrolytic vapors contained within said capacitor. This is a substantial improvement over existing practices whereby the life of the rubber gasket is extended, and the strength of the seal increased.

Another object of the invention is to provide a novel and improved construction of a capacitor header, preferably of a molded glass or mineral filled plastic material, including the employment of a vertically disposed annular peripheral flange and an adjacent concentric gasket retaining groove which serves to strengthen the seal of the capacitor and, at the same time, protect the rubber gasket from the electrolyte compound encapsulated within the capacitor, hence aiding to extend the life and improve the performance of the capacitor.

These, together with other objects and advantages of the invention reside in the details of the process and the operation thereof, as is more fully hereinafter described and claimed. References are made to drawings forming a part hereof, wherein like numerals refer to like parts throughout.

DESCRIPTION OF THE SEVERAL VIEWS OF THE DRAWING

FIG. 1 is a transverse sectional view of the casing of an electrolytic capacitor including the novel capacitor header, illustrating a typical construction of the capacitor encasement, according to a preferred embodiment and best mode of the present invention;

FIG. 2 is a sectional view of the capacitor header with the rubber gasket inserted therein.

FIG. 3 is a fragmentary sectional view detailing the rubber gasket and the annular vertically disposed flange of the capacitor header with the capacitor casing crimped to affect a seal between the casing and the header;

FIG. 4 is a fragmentary sectional view detailing the rubber gasket and the annular vertically disposed flange of the novel header before its assembly with the case;

FIG. 5 is a top perspective view of an assembled capacitor according to the present invention;

FIG. 6 is a sectional view of the capacitor header prior to application of the gasket element; and FIG. 7 is an auxiliary sectional view illustrating the temporary deformation of the header annular peripheral flange which results when the assembled capacitor employing the present header is subjected to extreme heat.

DESCRIPTION OF THE PREFERRED EMBODIMENT

Referring now to the drawing there is shown in FIG. 1 a transverse sectional view of an electrolytic capacitor encasement 10 comprising a casing 20 with a closed bottom end 20a and an open top end 20b, made of aluminum or another suitable material. The casing open top end 20b retains a molded cylindrical header 30 made of a fiberglass reinforced or mineral filled plastic compound, or the like, and a rubber gasket 40, or the like. The casing 20 is crimped or rolled over inwardly at its upper edge 22 thereby pressing into the rubber gasket 40 which is held in the annular gasket retaining groove 33 defined by the space between the annular peripheral flange 35 and the raised inner circular portion 37 of the header 30.

The lower peripheral edge of the header 30 rests upon and engages the inwardly directed ledge 24 of the casing. Said ledge resists the downwardly directed pressure exerted by the rolled over or crimped peripheral edge 22 of the casing 20, thereby preventing the header 30 from moving downwardly inside said casing. Furthermore, the contact between the lower peripheral edge of the header and the inwardly directed ledge 24 of the casing 20 also helps to seal the entire capacitor section encapsulating assembly comprising the header, the rubber gasket, and the casing.

FIG. 6, a sectional view of the invention, shows the improved molded header comprising: an annular vertically disposed peripheral flange 35 with an inward and downwardly sloping upper surface 34 that forms a sharpened edge 36 where the upper surface meets the outer circumferential vertically oriented surface of the flange; a concentric gasket retaining groove 33; an inner central raised circular portion 37 with terminals 50, made of aluminum or the like, extending therethrough; and an axially aligned cylindrical protrusion 38 with a rounded, or similarly shaped, lower end that functions to anchor the capacitor section within the encasement assembly 10.

Now referring to FIGS. 2 and 4, there is shown, respectively, a sectional view and an auxiliary sectional view of the improved header with the rubber gasket 40 retained therein. In the preferred embodiment, the top horizontal surface 41 of the gasket falls level with the top sharp edge 36 of the annular peripheral flange 35; however, the height of the gasket 40 (relative to the annular flange) may vary within any suitable range.

When the upper edge of the aluminum casing 20 is crimped or rolled over, as is shown in detail in the auxiliary sectional view of the FIG. 3, the rubber gasket only contacts the header 30 and the small crimped or rolled over portion 22 of the aluminum casing 20. The annular peripheral flange 35 of the new capacitor header prevents the rubber gasket 40 from contacting the inner wall of the case 20.

With both the new capacitor and conventional capacitors, the downward pressure exerted by the rolling over or crimping of the upper edge of the open end case forces the capacitor header down the inwardly directed ledge of the case. The action of the header moving down the inwardly directed ledge 24 forces outward the side wall of the case and increase the tolerance between: (1) the portion of the inside wall of the case located between the inwardly directed ledge 24 and the rolled over or crimped upper edge 22 and (2) the circumferential outside wall of the header. With the conventional header, once the electrolytic vapors escape past the point of contact between the header and the inwardly directed ledge 24, the vapors come into immediate contact with the gasket and begin to deteriorate said rubber gasket. However, the new header engages the case at the underside of the arc of the rolled over or crimped portion of the case and at the inwardly directed ledge of the case, thus creating two seals that must be penetrated by the electrolytic vapors before they come in contact with the rubber gasket—the third and final seal. The new header construction reduces the potential for electrolytic vapor leak paths and adds resistance to the electrolytic vapor penetration between the capacitor header and the inner wall of the case.

When a capacitor is exposed to excessive heat, the molded capacitor header, made of plastic or the like, begins to lose some of its physical properties. As temperature increases, the electrolytic vapor pressure increases, the plasticity of the molded header increases, and the increasing compressive force exerted on the underside of the header by vapor pressure begins to move the header upward. With the new capacitor header, as the header is compressed upwards, the sharp edge 36 of the annular flange 35 is pressed inward along the convex inner arcuate surface of the rolled over or crimped portion 22 of the case. The angle of the downward and inwardly sloping upper surface 34 of the annular flange 35, and the compressive forces exerted by the gasket 40 compel the annular peripheral flange 35 against the inner wall of the case 20. Consequently, said annular peripheral flange remains between the compressed gasket and the inner wall of the case while the lower peripheral edge moves up off of the inwardly directed ledge 24 of the case 20.

As the temperature abates, the vapor pressure decreases and the compressive forces of the rubber gasket compel the header back down against the internal shoulder of the casing. Likewise, as the header returns down to its original location, the compressive forces of the rubber gasket push the annular flange back into its original shape and position.

At the end of the temperature cycle, the header has resumed its original shape and rigidity, and the rubber gasket is still protected from the electrolytic vapors which injure it and, therefore, shorten the life of the effective operation of the capacitor.

The foregoing is considered as illustrative of the principle of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. An electrolytic capacitor comprising a casing having a closed bottom end and an open upper end; a capacitor section located within said casing having anode foils and cathode foils; porous separators for said foils; an electrolyte impregnating said foils; a header sealed to the open end of said casing and comprising molded plastic material; said header being formed to define gasket retaining and protecting means including a vertically displaced annular flange at the periphery of said header with an inwardly adjacent concentric gasket retaining groove which is defined by the space between said annular peripheral flange and a raised circular centrally located portion of said header; said vertically disposed annular peripheral flange having an inwardly and downwardly sloping upper surface whereby a sharp edge is defined at the top of the upper surface where said upper surface meets the outer vertically disposed surface of the annular peripheral flange; and an elastomeric gasket contained within said gasket retaining groove.

2. An electrolytic capacitor as set forth in claim 1 in which said molded header material includes glass fiber and mineral filled reinforcing.

* * * * *